United States Patent [19]

Lypka

[11] Patent Number: 4,510,742

[45] Date of Patent: Apr. 16, 1985

[54] FLAX STRAW BUNCHER

[76] Inventor: Alexander Lypka, Box 212, Abernethy, Saskatchewan, Canada, S0A 0A0

[21] Appl. No.: 602,458

[22] Filed: Apr. 20, 1984

[30] Foreign Application Priority Data

Apr. 26, 1983 [CA] Canada .................................. 426716

[51] Int. Cl.³ ............................................. A01D 85/00
[52] U.S. Cl. ........................................ 56/384; 56/396; 130/27 R
[58] Field of Search ................ 56/384, 396, 387, 16.1; 130/27 R

[56] References Cited

U.S. PATENT DOCUMENTS

| | | | |
|---|---|---|---|
| 1,841,467 | 1/1932 | Draper | 56/384 |
| 2,553,484 | 5/1951 | Stauch | 130/27 R |
| 2,592,841 | 4/1952 | Acton | 56/16.1 |
| 2,645,891 | 7/1953 | Berkley | 56/16.1 |
| 2,662,363 | 12/1953 | Worden | 56/16.1 |
| 2,898,724 | 8/1959 | Robinson | 56/16.1 |

Primary Examiner—Jay N. Eskovitz
Attorney, Agent, or Firm—Stanley G. Ade

[57] ABSTRACT

A flax straw buncher for use behind a combine in a single operation where the straw is bunched behind the combine for subsequent burning comprises a bifercated frame section extended behind a hitch with groundwheels at the rear of the frame section. A rake portion is pivotally mounted on the frame sections so as to extend rearwardly therefrom transversely thereacross. The rake portion includes downwardly depending tubular steel fingers and provides the only connection transversely of the bifercated frame so that a space is provided in front of the rake and inwardly of the frame section for formation of a bunch of the straw.

7 Claims, 5 Drawing Figures

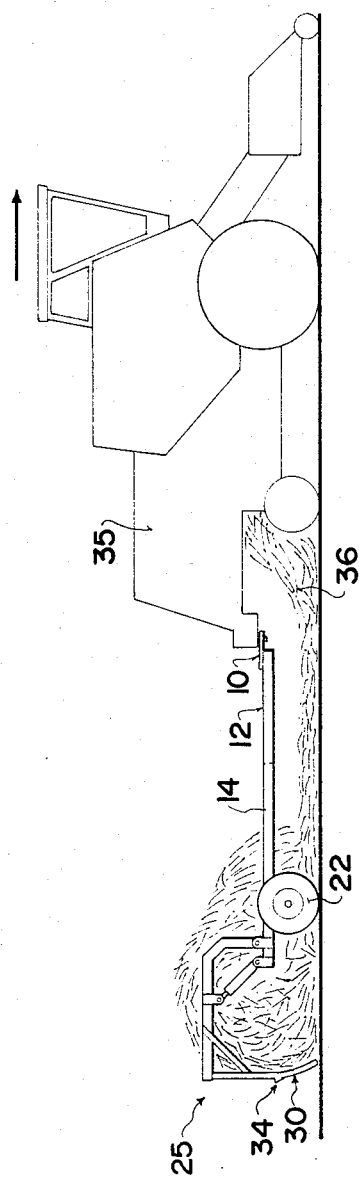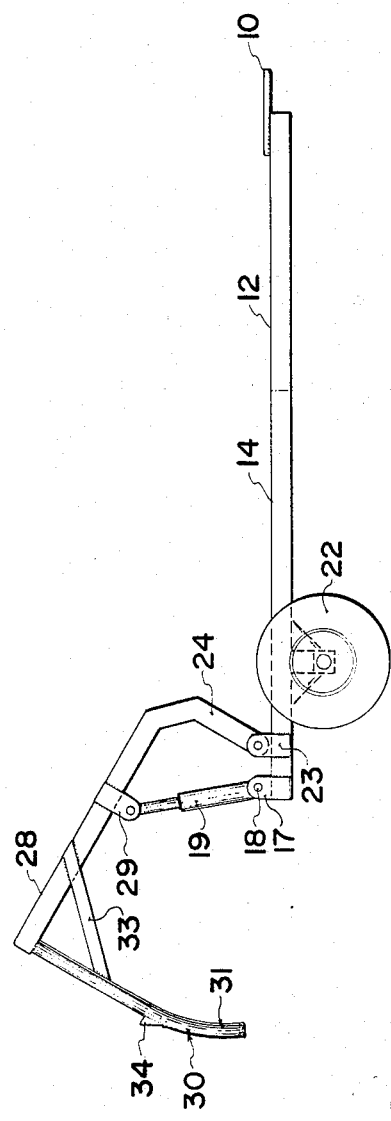

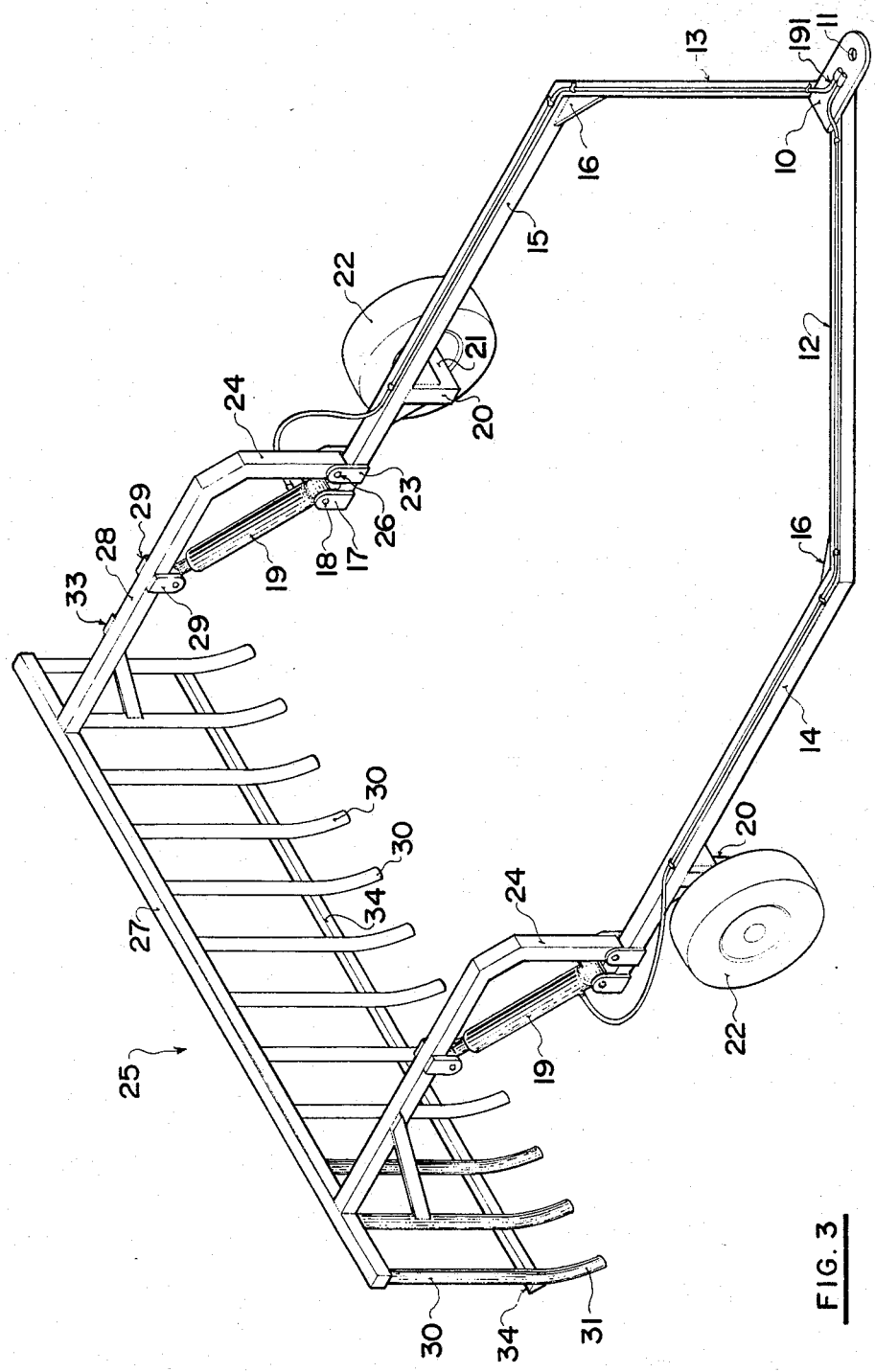

FLAX STRAW BUNCHER

BACKGROUND OF THE INVENTION

This invention relates to a flax straw buncher and to a method of using the flax straw buncher.

Conventionally the harvesting of flax using a combine harvester leaves the straw arranged in swathes behind the combine for collection in a later process. The straw is not of value but needs to be collected into bunches in order to be burned in the conventional manner. The subsequent raking of the straw into bunches is a particularly difficult and onerous job due to the nature of the straw and requires considerable effort and time which could of course be better utilized on a more productive task.

This problem does not arise significantly with other crops where the straw can be chopped and spread if it is not required or can be collected and bailed in a further process if it is to be used. In this circumstance the later process of collecting is a productive process as opposed to the raking of the flax straw which is simply a clearing process with no saleable end result.

SUMMARY OF THE INVENTION

It is one object of the invention therefore to provide a flax straw buncher which can be used to directly produce bunches of the flax straw by towing the buncher behind the combine harvester harvesting the crop.

The invention therefore provides according to a first aspect a flax straw buncher comprising a hitch for attachment to a combine, a frame structure including a pair of hitch bars extending rearwardly and outwardly from the hitch, a pair of ground wheels supporting the frame structure at spaced positions rearwardly of and on either side of the hitch, a rake portion including plurality of depending fingers for engaging and raking the ground, means mounting the rake portion on the frame structure such that the space defined upwardly and in front of the rake portion and inwardly of the hitch bars is free from encumbrances whereby a bunch of said flax straw can be formed in said space in front of the rake portion.

It is one advantage of the invention therefore that the whole of the space forwardly of the rake portion and inwardly of the hitch bars including the space upwardly thereof is free from encumbrances provided by framework or lifting mechanisms to provide a free space in which the straw can be formed into a bunch.

To more effectively achieve a large bunch, the depending fingers of the rake portion are preferably substantially straight, preferably formed by heavy duty tubular material and are preferably braced by crossmembers parallel to the upper support bar of the rake portion.

To yet provide a larger space inwardly of the hitch bars and the wheels, the rake portion is preferably pivotaly mounted on arms extending rearwardly of the frame structure from a position adjacent to the wheels with the only interconnection between the frame structure adjacent the wheels being provided by the rake portion.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 2 is a side elevational view of the flax straw buncher of FIG. 1.

FIG. 3 is an isometric view of the flax straw buncher of FIGS. 1 and 2.

FIG. 4 is a schematic side elevational view of the buncher of FIGS. 1, 2 and 3 attached to a combine harvester for forming a bunch of straw behind the combine.

In the drawings like characters of reference indicate corresponding parts in the different figures.

DETAILED DESCRIPTION

Figure 1:
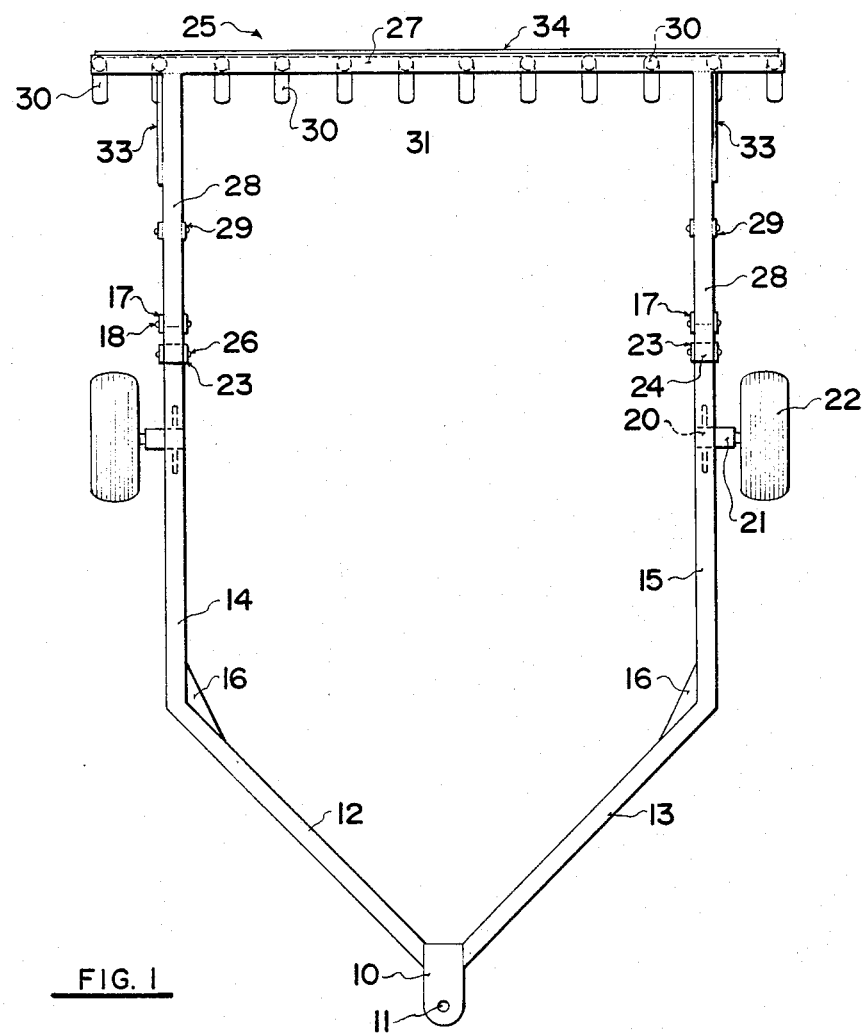
FIG. 1 is a plan view of the flax straw buncher.

The flax straw buncher comprises a hitch 10 in the form of a simple horizontal plate with a vertical hole 11 for cooperation with a conventional hitch coupling on the rear of a combine harvester. The hitch 10 is connected to a pair of hitch bars 12 and 13 extending rearwardly and outwardly from the hitch symmetrically relative thereto to the full width of the buncher. The bars 12 and 13 comprise part of a framework further incorporating rearwardly extending sides frame members 14, 15 which are fixed suitably by welding to the hitch bars 12, 13 with the junction reinforced by a triangular support plate 16.

The arms 14, 15 terminate in an upwardly extending pivotal coupling member 17 for receiving on a pivot pin 18 the cylinder 19 of a piston/cylinder arrangement. A short distance forwardly of the termination of each of the arms 14, 15 is provided a downwardly depending leg 20 providing an axle 21 for supporting a groundwheel 22. The details of the axle 21 and groundwheel are shown only schematically since they will be well known to one skilled in the art. The bars 12, 13, the arms 14, 15 and the legs 20 are all formed from square section steel tubing welded together in conventional manner. In one example 3 inch square tube is employed to provide the necessary strength. It will be noted particularly that the framework provided by the arms is bitercated at the hitch 10 and there is no transverse interconnecting member across the frame section. This does not preclude the use of a short strengthening member adjacent the junction of the hitch bars 12, 13 either similar to the reinforcing member 16 or possibly of a larger size provided by square section tubing similar to the frame section itself.

Intermediate the pivot support 17 and the leg 20 is provided a further pivot support 23 on the upper face of the arm 14, 15. Upstanding arms 24 of the rake section generally indicated at 25 are mounted on the supports 23 and by pivot pins 26 passing through the lower section of the arms 24 and through the supports 23 providing pivotal movement about a transverse horizontal axis of the arms 24. The rake portion 25 includes a crossbar 27 extending transversely to the rake across the top thereof which is similarly of square cross-section tubing and is coupled to the arms 24 by forwardly extending horizontal coupling bars 28. Thus the crossbar 27 is supported on the supports 23 for pivotal movement about the axis of the pins 26 under control of the cylinders 19, the piston of which is connected by a pivot coupling 29 to the coupling bars 28.

The rake portion 25 further includes depending fingers 30 which extend from the crossbar 27 to the ground so as to just contact the ground when the cylinders 19 are in the retracted position. The fingers 30 are substantially straight that is they include a main straight vertical depending portion 31 and a lower portion 32 which extends slightly forwardly from the vertical direction. The fingers 30 are formed of circular cross-section tubular steel to provide a rugged construction suitable to resist bending when contacting raised portions of the ground or stones or similar obstacles. In one example the tubular steel forming the fingers 30 is of 1½" diameter with the fingers spaced along the bar 27 on 12" centres. The fingers 30 are welded to the bar 27 and may be supported by a brace 33 to strengthen the junction. Furthermore a reinforcing support 34 is provided along the rear of the fingers 30 at the junction between the portions 31 and 32 so that the fingers cooperate to reinforce one another and braces 37 are connected between two of the fingers and two arms 28.

The outside diameter of a rubber tire on the ground wheel 22 is of the order of 24 inches which is a conventional size in machines of this type and provides suitable running conditions over normal terrain. The length of the fingers 30 is considerably greater than the diameter of the wheels 22 and is generally greater than one meter in length. Thus the arms 28 which lie in the same horizontal plane at the top of the fingers 30 are a considerably higher level than the frame section provided by the arms 14, 15. The length of the fingers 30 can be chosen in accordance with requirements but is sufficient to provide control over suitable sized bunches of straw and to ensure that the bunch does not spill over the top of the bar 27 until a bunch of desired size has been achieved.

Turning now to FIG. 4, in use of the straw buncher of FIGS. 1 to 3, the hitch 10 is attached to the rear of a combine 35 so that the straw buncher is drawn directly behind the combine in the path of straw 36 deposited from the rear of the combine. The straw is picked up by the fingers 30 and rolled into a bunch in the space defined between the bar 27, the arms 28 and the arms 14, 15. As explained previously there are no frame cross-members in this space, nor are there any other encumbrances such as lifting mechanism to interfere with the desired bunching and rolling of the straw. For this reason the only interconnection between the arms 14, 15 is provided by the rake portion and particularly the bar 27 which forms part of the rake portion.

The bar 27 extends for a short distance beyond the junction thereof with the connecting bars 28 with an outermost finger 30 extending downwardly from a position beyond the junction. The additional fingers 30 ensure that no straw escapes from the bunch beyond the end of the rake portion but it will be appreciated that the main bunch forming takes place between the arms 28. Thus the space where the bunch is formed allows the bunch to form up above the level of the arms 28, the arms 14, 15 and also the bar 27 bearing in mind that the bunch cannot be allowed to reach such a size that it begins to deposit excess material over the back of the bar 27.

When the bunch is of a suitable size as determined by the operator of the combine, the cylinders 19 are operated by hydraulic supply lines schematically indicated at 191 coupled to the combine in a conventional manner thus extending the piston in the cylinders 19 to raise the coupling bars 28 and hence to raise the rake portion and fingers 30 to a position where the bunch can be released from the bottom of the fingers. The raised position is shown in FIG. 2. The bunch is thus deposited in the field behind the combine for subsequent burning of the straw.

Figure 5:
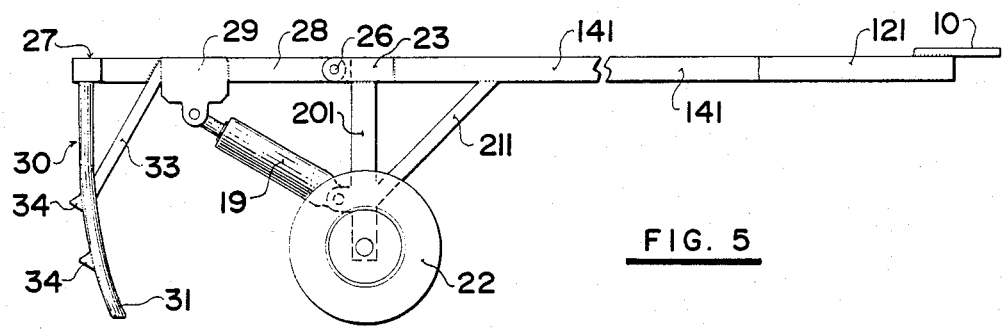
FIG. 5 is a side elevational view of a modified arrangement.

In FIG. 5 is shown a modified arrangement which is basically the same structure as the embodiment of FIGS. 1 to 4 but the hitch bars 141, 121 (those corresponding to elements 15 and 13 are not visible) are arranged at the same height as the rearwardly extending coupling bars 28. A leg 201 supported by a strut 211 extends forwardly from a position immediately in front of the coupling 26 for attachment to the wheel 22. The piston cylinder 19 extends between the leg 201 and the coupling 29 or the coupling bars 28.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A flax straw buncher comprising a hitch for attachment to a combine, a frame structure including a pair of hitch bars extending rearwardly and outwardly from the hitch, a pair of spaced side frame members extending rearwardly from said hitch bars in spaced parallel relationship, a pair of ground wheels each attached separately to a respective one of said side frame members for supporting the frame structure at spaced positions rearwardly of and on either side of the hitch, a transverse rake portion including plurality of depending fingers for engaging and raking the ground, means mounting the rake portion on the frame structure including a pair of arms each extending forwardly from the rake portion such that the space defined upwardly and in front of the rake portion and inwardly of the hitch bars and side frame members is free from encumbrances whereby the rake portion provides the only transverse interconnecting member across the frame structure adjacent the ground wheels, whereby a bunch of said flax straw can be formed in said space in front of the rake portion, and means mounting each of said forwardly extending arms for pivotal movement on a respective one of the side frame members whereby the whole of the rake portion can be raised relative to the frame structure to release a bunch formed in front of the rake portion.

2. A buncher according to claim 1 including hydraulic lifting means arranged adjacent both forwardly extending arms for raising said arms.

3. A buncher according to claim 1 wherein the arms are pivotly mounted on the frame structure adjacent said ground wheels.

4. A buncher according to claim 1 wherein the fingers of the rake portion are longer than the diameter of the ground wheels.

5. A buncher according to claim 1 wherein the fingers of the rake portion are longer than one meter.

6. A buncher according to claim 1 wherein the fingers are formed from tubular material.

7. A buncher according to claim 1 wherein the fingers extend substantially straight and vertically to the ground.

* * * * *